A. J. PENOTE.
CABLE SPLICE.
APPLICATION FILED JUNE 14, 1911.
1,113,138.
Patented Oct. 6, 1914.
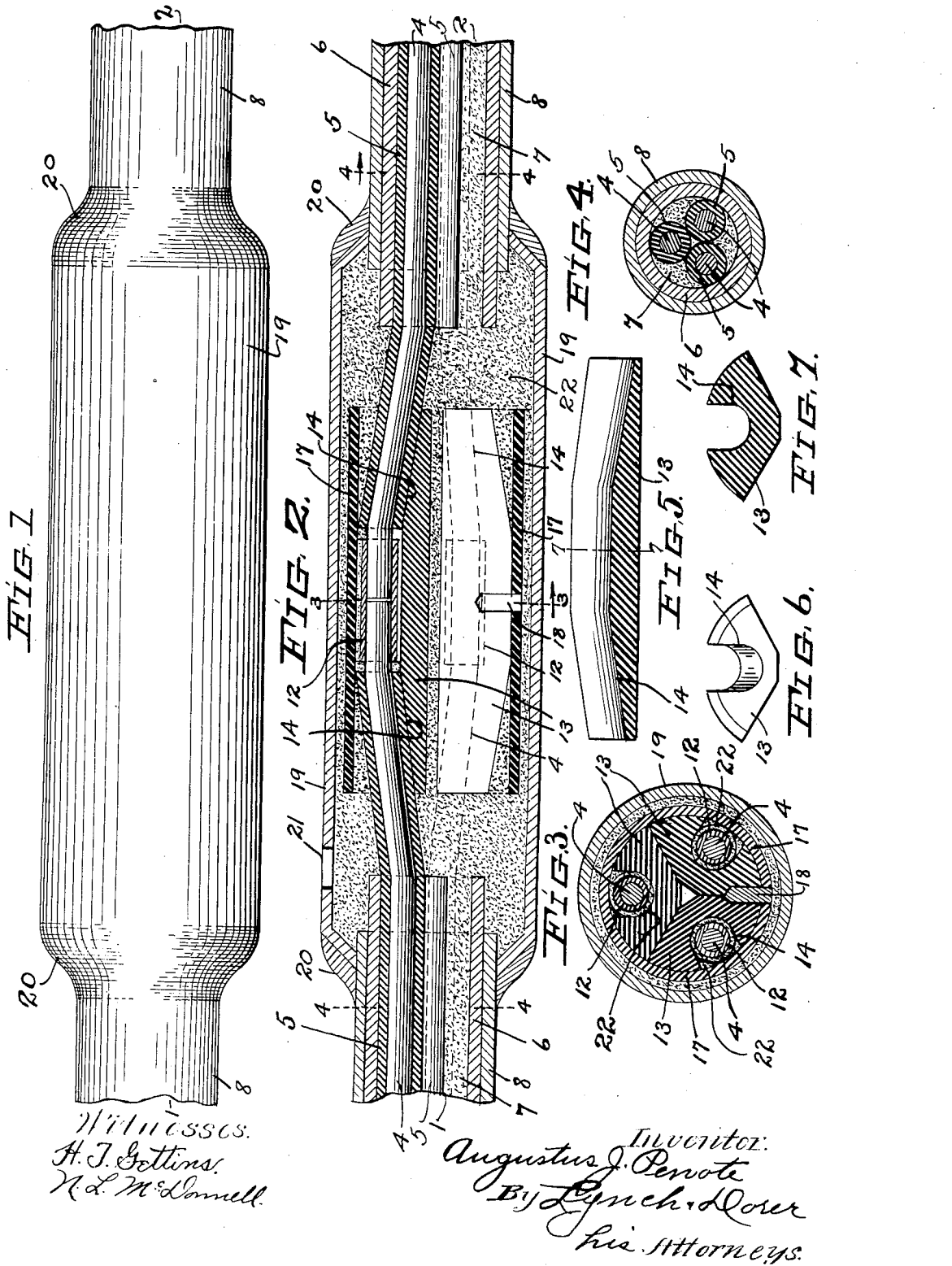

UNITED STATES PATENT OFFICE.

AUGUSTUS J. PENOTE, OF CLEVELAND, OHIO.

CABLE-SPLICE.

1,113,138.    Specification of Letters Patent.    Patented Oct. 6, 1914.

Application filed June 14, 1911. Serial No. 633,048.

*To all whom it may concern:*

Be it known that I, AUGUSTUS J. PENOTE, a citizen of the United States of America, residing at Cleveland, in the county of Cuyahoga and State of Ohio, have invented certain new and useful Improvements in Cable-Splices; and I hereby declare the following to be a full, clear, and exact description of the invention, such as will enable others skilled in the art to which it pertains to make and use the same.

This invention relates to new and useful improvements in splices for electric cables.

The object of my invention is to provide a device of this description which can be cheaply provided, readily and quickly applied and which will thoroughly insulate the spliced ends of the conductors or wires composing the cable.

My invention, therefore, consists in the features of construction and combination of parts described in the specification, pointed out in the claims and illustrated in the accompanying drawings.

In the accompanying drawings Figure 1 is a view in elevation of a cable splice embodying my invention. Fig. 2 is a central longitudinal section of the same. Fig. 3 is a section on line 3—3, Fig. 2. Fig. 4 is a section on line 4—4, Fig. 2. Fig. 5 is a central longitudinal section through one of the insulating blocks. Fig. 6 is an end view of the same. Fig. 7 is a section on line 7—7, Fig. 5.

Again referring to the drawings 1 and 2 indicate the sections of a cable which are to be spliced together and as shown each section comprises three conductors of wires 4 and each conductor is wrapped with paper or other insulating material 5 and the said conductors are inclosed together in an insulating wrapper 6. The space between the conductors in said wrapper 6 is filled with an insulating material 7 and the wrapper 6 is in turn incased in a coating of lead 8; all of which is the usual construction and forms no part of my invention.

In proceeding to form my improved splice the lead casing 8, the insulating wrapper 6 and the insulating material 7 are removed from the ends of the sections of cable which are to be spliced and the ends of the conductors or wires are bared. The end of one conductor of each cable section is then abutted against the end of a conductor in the other cable section and around the abutting ends is secured a copper sleeve 12. In order to properly space the jointed ends of the conductors and prevent the short-circuiting of the current I provide a series of insulating blocks 13, there being one of the blocks for each of the joints, so that in the construction shown three such blocks will be utilized. Each of the said blocks 13 is sector-shaped in cross section and the outer surface thereof is slightly tapered or inclined toward the ends and the said blocks are made of such size that when the sides thereof are abutted together they form a cylindrical shaped member slightly tapering at each end. In each of the insulating blocks 13 is formed a longitudinal groove 14 adapted to receive the jointed ends of a conductor and the bottom of the said groove is inclined downwardly toward each end the same as the outer surface of the block. Around the insulating block 13 is arranged a splice jacket 17 of any suitable insulating material which serves to hold the blocks in their proper relation to each other, and a small dowel pin 18 is forced through the jacket and between a pair of the said blocks in order to secure the blocks more tightly in the jacket. Around the splice jacket and over the ends of the cable sections is arranged a lead sleeve 19 which is united at each end to the lead casing of the cable sections by a wiped joint 20. In the sleeve 19 is formed an opening 21 through which an insulating material 22 is poured which completely fills any empty space within the sleeve.

What I claim is,—

1. The combination with two cable sections, each cable section having a plurality of conductors, of a splice for connecting together said cable sections, said splice comprising a series of sector-shaped blocks arranged with their straight sides in contact and together forming an insulating and spacing member, each of said blocks being provided with a groove arranged centrally in the curved surface thereof adapted to receive the jointed ends of a conductor, said groove inclining downwardly toward each end of said block, a splice jacket arranged around said blocks, a pin for locking said blocks in said jacket, a sleeve arranged to inclose said splice jacket, said sleeve being connected at its ends with the cable sections which are to be spliced and insulating material arranged within said sleeve and inclosing said splice jacket, for the purpose set forth.

2. The combination with two cable sections, each cable section having a plurality of conductors, of a splice for connecting together said cable sections, said splice comprising a series of sector-shaped blocks arranged with their straight sides in contact and together forming an insulating and spacing member, each of said blocks being provided with a groove arranged centrally in the curved surface thereof adapted to receive the jointed ends of a conductor, said groove inclining downwardly toward each end of said block and a splice jacket arranged around said blocks so as to hold said blocks in their relative positions.

3. In combination with two cable sections, each cable section having a plurality of conductors, of a splice for connecting together said cable sections, said splice comprising a series of sector-shaped blocks arranged with their straight sides in contact and together forming an insulating and spacing member, each of said blocks being provided with a groove arranged centrally in the curved surface thereof adapted to receive the jointed ends of a conductor, said groove inclining downwardly toward each end of said block, a splice jacket arranged around said blocks so as to hold said blocks in their relative positions, a sleeve arranged to inclose said splice jacket, said sleeve being connected at its ends with the cable sections which are to be spliced and insulating material arranged within said sleeve and inclosing said splice jacket, for the purpose set forth.

In testimony whereof, I sign the foregoing specification, in the presence of two witnesses.

AUGUSTUS J. PENOTE.

Witnesses:
  VICTOR C. LYNCH,
  N. L. McDONNELL.